UNITED STATES PATENT OFFICE.

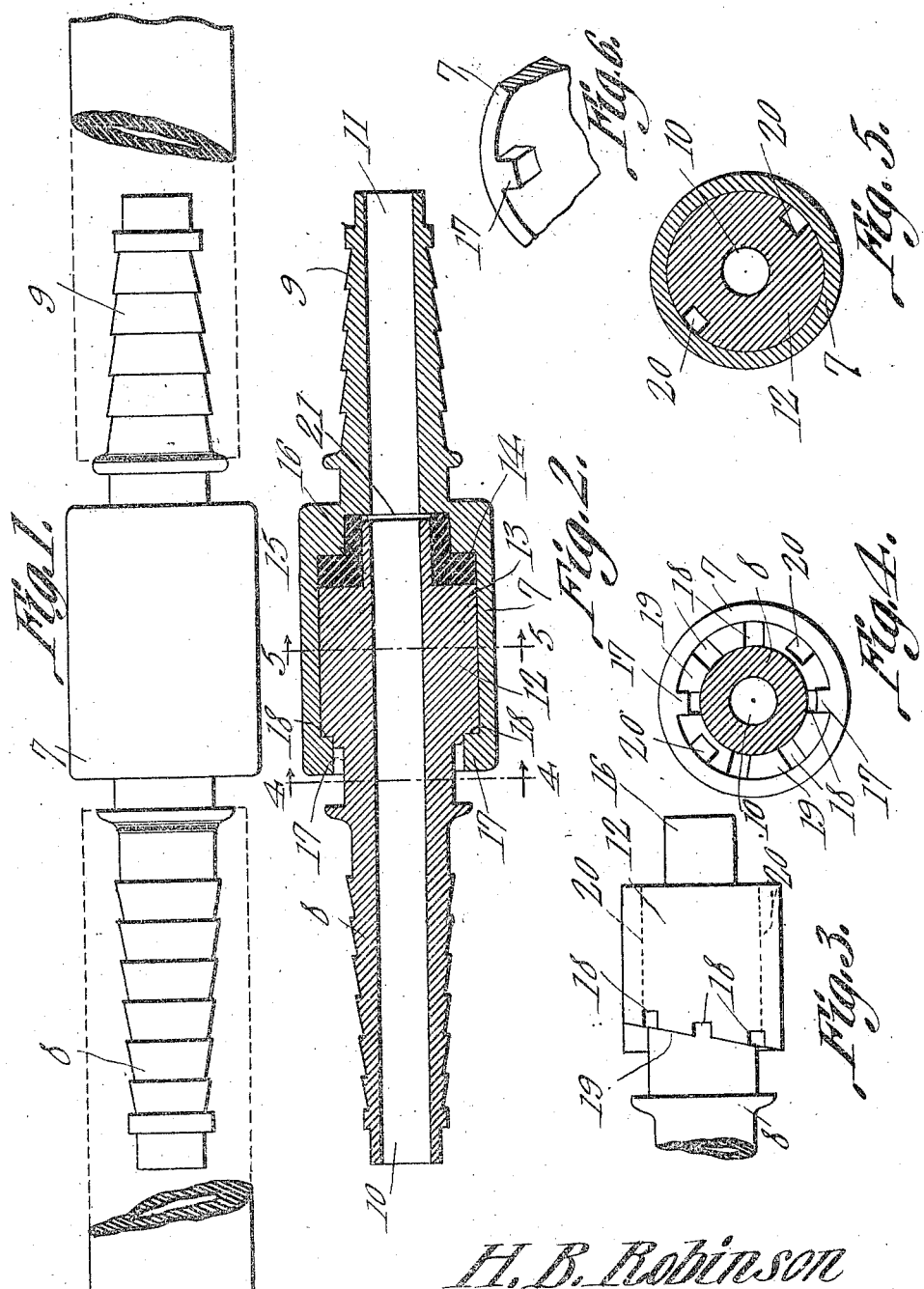

HARRY B. ROBINSON, OF MUSKEGON, MICHIGAN.

HOSE-COUPLING.

1,029,715.  Specification of Letters Patent.  Patented June 18, 1912.

Application filed November 4, 1911. Serial No. 658,558.

*To all whom it may concern:*

Be it known that I, HARRY B. ROBINSON, a citizen of the United States, residing at Muskegon, in the county of Muskegon and State of Michigan, have invented a new and useful Hose-Coupler, of which the following is a specification.

This invention relates to hose couplings of the male and female type, and has for its object to provide a coupling of this character which is simple in construction rendering it cheap to manufacture; and convenient and efficient in its use.

Another object is to provide a coupling of this character wherein the male and female members are engaged in a novel manner.

A further object is to provide a compressible member between the male and female members to force same into engagement and to also prevent the escape of the gas or liquid passing through the coupling, and also dispensing with the necessity of machining either the male or female parts to provide a tight metallic fit.

With the foregoing objects in view this invention is embodied in the novel construction and combination of parts as hereinafter described and claimed, reference being had to the accompanying drawing, wherein:—

Figure 1 is a side elevation of the coupler. Fig. 2 is a longitudinal central section thereof. Fig. 3 is a fragmental elevation of the male member. Fig. 4 is a section on the line 4—4 of Fig. 2. Fig. 5 is a section on the line 5—5 of Fig. 2. Fig. 6 is a fragmental view in perspective of the female member.

Referring in detail to the drawing, the female member of the coupling is designated at 7 having a hose nipple 9 projecting from the outer end thereof. This female member 7 is provided with a pair of inwardly projecting diametrically opposed lugs 17 at its inner end, the said lugs being square in contour, and with a secondary socket 21 in the outer end of its socket. A rubber or other resilient ring or washer 14 fits snugly within the primary socket 13 of the female member and has a nipple 15 projecting therefrom and fitting snugly in the socket 21 and seating against the outer end of the socket. This ring or washer 14 is seated tightly against the outer end of the primary socket of the female member and is retained therein by its frictional engagement with the female member.

The male member of the coupler comprises a cylindrical head 12 having the hose nipple 8 projecting from the outer end thereof and having a nipple 16 projecting from the inner end thereof. This head 12 is provided with diametrically disposed longitudinal channels 20 extending throughout the length of the head and on its outer end the head is provided with spiral shoulders 19 extending between the respective channels 20. Each of the spiral shoulders 19 is provided with a series of square notches 18. The bores 10 and 11 of the male and female members, respectively, are of equal diameter thus permitting the unobstructed passage of gases or liquid through the coupler and extend outwardly from the end of the nipple 16 and the secondary socket 21, respectively.

In assembling the members of the coupler, the head 12 of the male member is inserted snugly into the primary socket 13 of the female member, the lugs 17 passing through the channels 20, and upon the head 12 passing the lugs 17 the two members are rotated with respect to each other thus causing the lugs 17 to ride upon the spiral shoulders 19 causing the two members to be forced together and at the same time the head of the male member coincides with and engages the ring 14 causing the same to be compressed to yieldingly force the head outward and at the same time preventing the escape of the gas or liquid passing through the coupler. The notches 18 of the shoulders 19 are adapted to receive the lugs 17 thus retaining the two members in engaged position, and due to the outward tension of the ring 14 the notches 18 are caused to tightly engage the lugs 17 to prevent the rotation of the two members relative to each other.

By the provision of the spiral shoulders 19 and the series of notches 18 in each shoulder, the two members may be adjusted at various positions relative to each other, the ring 14 yielding pressing the head outward permitting the head to be forced inward to disengage the head from the lug 17 to permit the head to be rotated and cause the lugs 17 to ride upon the spiral shoulders and engage other notches 18. In detaching the two members the head 12 is pressed inward to disengage the same from the lugs 17 and the two members are rotated with respect to each other to bring the lugs 17 in alinement with the channels 20 of the head 12 whereby the head may be withdrawn from the female member. The nipple 16 of the head 12 upon the two members being attached, snugly enters the ring 14 and the nipple 15 thereby preventing the said nipple from being forced out of position and the nipple in being compressed also serving to make a secure joint.

When the two members of the coupler are attached, the two bores 10 and 11 are adapted to coincide thereby presenting a direct and unobstructed passage through the coupler.

It will thus be seen that the two members of the coupler may be readily and rapidly attached with each other and when attached with each other are prevented from being disengaged by external forces such as the coupler is susceptible to in its ordinary use. The tension between the two members may also be increased or decreased as desired or necessary, by pressing the two members together to disengage the head 12 from the lugs 17 and then rotating the members relative to each other to engage the lugs 17 in the other notches 18 as above described, or by disengaging the lugs 17 from the notches 18 and rotating the members in the proper direction, the lugs 17 may be brought into alinement with the channels 20 whereupon the members may be detached from each other.

This coupler is very simple in its construction, the two members being cast from suitable metal and need not be machined. The two parts of the coupler may therefore be taken from the molds after they are cast and after being suitably cleaned in the customary manner may be adapted for use, the ring or washer 14 being inserted into the female member. It is not necessary for the head 12 to fit tightly into the female member for the reason that the two members in being brought together cause the nipple 15 and the ring or washer 14 to be compressed thereby preventing the escape of the gas or liquid passing through the coupler and at the same time the said ring forces the head outward causing the head to engage with the lugs 17 thereby locking the two members against rotation relative to each other.

As a whole, this coupler is devoid of complexity of parts and is on the other hand of very simple construction, which is the primary aim of this invention. The two members are capable of convenient and rapid attachment from each other, and the coupler in its various features being such as to be highly preferable over the various couplers now in use.

What is claimed is:—

1. A coupling comprising a female member having a primary and a secondary socket and a bore extending from the secondary socket, a compressible ring in the female member seating against the end of the primary socket and having a projecting nipple fitting snugly in the secondary socket and seating against the end thereof, and a male member insertible into the primary socket to seat against and compress the said ring and engageable in the female member, the male member having a nipple projecting therefrom of smaller diameter than the said secondary socket and adapted to enter the said ring and its nipple and having a bore of equal diameter with the former bore and extending from the end of the nipple and adapted to coincide with the former bore.

2. A coupling comprising a female member having a primary and a secondary socket and a bore extending from the secondary socket, and having an inner lug at its inner end, a compressible ring fitting snugly within the female member and seating against the outer end of the primary socket and having a nipple projecting therefrom and fitting snugly in the said secondary socket and seating against the end of the secondary socket, and a male member having a head insertible snugly into the primary socket of the female member, the said head having a longitudinal channel for the passage of the said lug and having a spiral shoulder on its outer end provided with lug receiving notches, and the said head having a nipple of smaller diameter than the said secondary socket adapted to enter the said ring and its nipple and the said head being adapted to coincide with and compress the said ring, the male member having a bore of equal diameter with the former bore and extending from the end of its nipple and adapted to coincide with the former bore.

In testimony that I claim the foregoing as my own, I have hereto affixed my signature in the presence of two witnesses.

HARRY B. ROBINSON.

Witnesses:
 RINDER F. COOPER,
 BENJ. H. TELLMAN.